R. A. B. WALSH.
METHOD OF AND MACHINE FOR MAKING WIRE GLASS.
APPLICATION FILED DEC. 2, 1907.
940,838.
Patented Nov. 23, 1909.
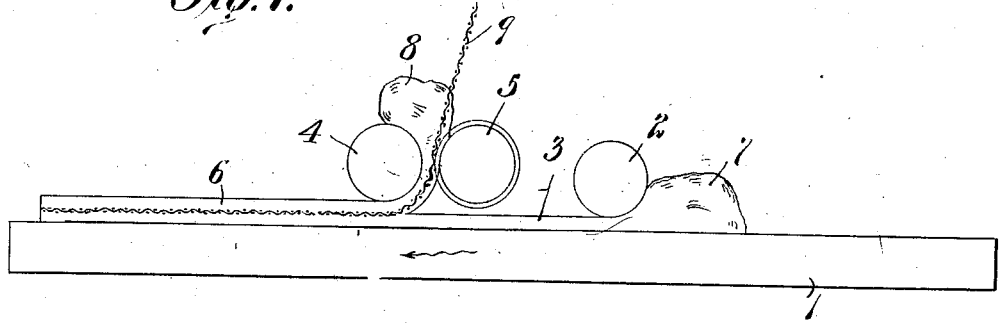
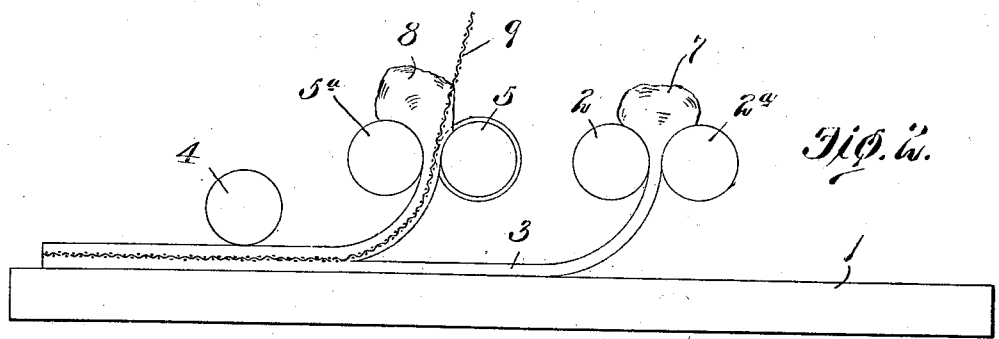
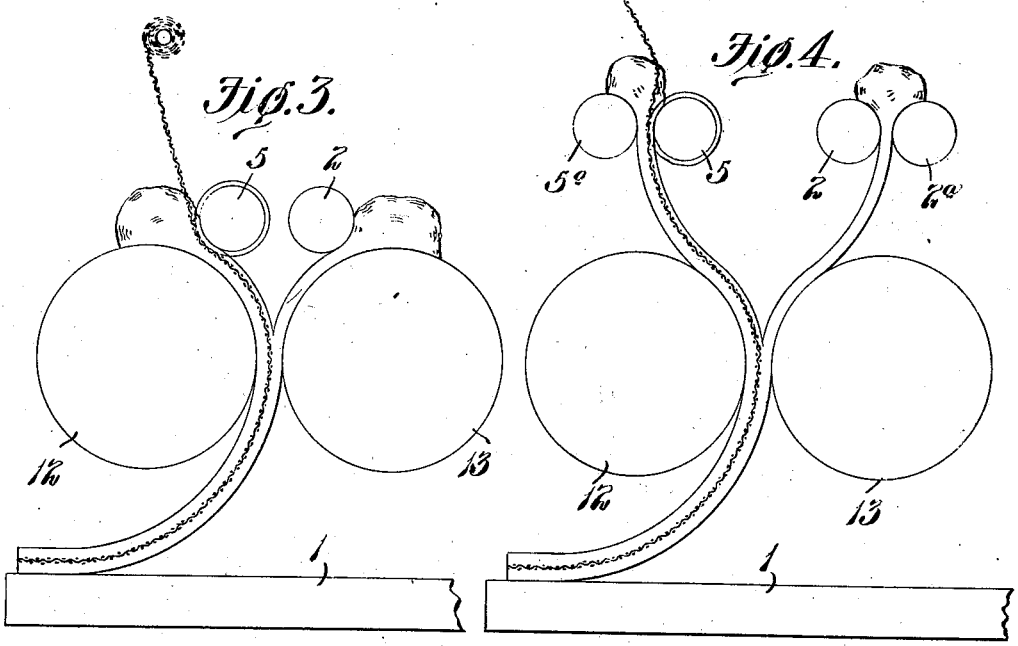
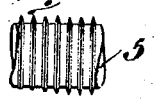
Witnesses:
Geo. R. Ladson
Nello L. Church
Inventor,
Robert A. B. Walsh.
By Bakewell & Cornwall Attys

UNITED STATES PATENT OFFICE.

ROBERT A. B. WALSH, OF ST. LOUIS, MISSOURI.

METHOD OF AND MACHINE FOR MAKING WIRE-GLASS.

940,838.

Specification of Letters Patent.   Patented Nov. 23, 1909.

Application filed December 2, 1907.   Serial No. 404,846.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1, 2, 3 and 4 are side elevations of different forms of apparatus which may be used in practicing my invention; and Fig. 5 is a conventional illustration of the embedding roller.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original, bright and new appearance after it has been embedded in the glass.

In the manufacture of wire glass, the tendency of the wire is to contract and "draw" the glass so as to produce an uneven or an irregular surface. It has been proposed, see for illustration the patent to Walsh, No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first-mentioned. In both of these methods, the wire, on account of its exposure to atmosphere after being heated, loses its bright and new appearance and looks black in the finished sheet. In the Schmertz method the weld between the two layers occurs principally in the plane of the wire and as the wire is at places left free to draw this action is sometimes observed on the surface of the second layer.

Briefly stated, my present invention contemplates the method of and an apparatus for forming wire glass, said method consisting in first forming a bottom layer or sheet of glass and thereafter forming a second sheet or layer of glass having a wire mesh buried therein and welding it to the upper surface of the first-formed layer. Preferably, the wire mesh is embedded in the underneath surface of the second sheet or layer at the time said sheet is being formed so that in its heated condition the wire mesh will not be exposed to atmosphere and, accordingly, will preserve its bright and new appearance in the glass.

It is obvious that my invention is not limited to a single type of machine but may be embodied in different forms of apparatus. I have shown several of these forms in the accompanying drawings and will first refer to that shown in Fig. 1 which comprises a table 1 having a smooth-surface roller 2 arranged above the upper surface thereof at a distance equal to the thickness of the bottom layer 3. A smooth-surface roller 4 is arranged above the table 1 a distance equal to the thickness of the finished product, and an embedding roller 5 coöperates with the roller 4 to form a top layer or sheet 6 and bury a wire mesh therein, the roller 4 coöperating with the table 1 to combine the two layers 3 and 6 together. In practicing my invention with apparatus of this description a mass of molten glass 7 is dumped onto the table adjacent the roller 2 and said table is then moved in the direction of the arrow to cause the roller 2 to form said mass of molten glass into a bottom layer 3. When the end of said bottom layer or sheet reaches the rollers 4 and 5 a mass of molten glass 8 is poured between said rollers which form said mass into a top layer 6 having a wire mesh 9 buried in the underneath surface thereof. The layer 6 falls onto the upper surface of the bottom layer and is welded thereto by the smooth-surface roller 4.

From the foregoing it will be seen that two separate masses of molten glass are formed progressively into two independent layers which are combined together to produce a single sheet. The roller 5, due to the embedding blades thereon, will force the wire mesh below the underneath surface of the top layer 6 simultaneously with the operation of forming said layer so that said wire mesh will be completely covered by glass and thus be prevented from oxidizing as would be apt to occur if it were exposed to the air while in its heated condition. Although I have previously stated that the table is moved longitudinally it will, of course, be understood that this table could be stationary and the rollers moved longitudinally thereof without departing from the spirit of my invention.

In Fig. 2 I have shown another form of apparatus which can be used for practicing my method. This apparatus comprises two smooth-surface rollers 2 and 2ª for forming the bottom layer or sheet, an embedding roller 5 and a smooth-surface roller 5ª for forming the top layer having a wire mesh buried in the underneath surface thereof, and a smooth-surface roller 4 for combining the top and bottom layers together to form a single sheet of wire glass.

In Fig. 3 I have shown still another form of apparatus which can be used for practicing my method. This apparatus consists of two smooth-surface rollers 12 and 13 spaced apart a distance equal to the thickness of the finished product, a smooth-surface roller 2 coöperating with the roller 13 to form the bottom layer, and an embedding roller 5 coöperating with the roller 12 to form the top layer and bury the wire mesh in the underneath surface thereof, the rollers 12 and 13 also operating to combine the two layers together to form a single sheet. Instead of having the embedding roller 5 coöperate with the roller 12 to form the top layer 6 and embed the wire mesh in the underneath surface thereof, and the smooth surface roller 2 coöperate with the roller 13 to form the bottom layer, said embedding roller 5 and smooth-surface roller 2 can coöperate with supplemental smooth-surface rollers 5ª and 2ª, as in the apparatus shown in Fig. 4, and the two rollers 12 and 13 be used simply to combine the two layers together.

It will be observed from the foregoing that a complete sheet of wire glass is formed; to wit, a sheet or layer of glass having wire buried beneath its under surface, and an independent layer of glass is then formed and combined with the layer which contains the wire mesh; said independent layer filling in the spaces in the underneath surface of the layer which contains the wire mesh and becoming thoroughly welded thereto.

By referring to Fig. 5 it will be noted that the embedding roller 5 is provided with embedding blades which are preferably made thin, deep and tapering to a knife edge so that they will have the least amount of surface contact with the wire to be embedded. These embedding blades are also spaced as far apart as practicable and yet sufficiently close together so that they will uniformly bury the wire mesh beneath the surface of the layer of glass.

From the above it will be noted that the embedding roller which I propose to use is not a corrugated roller in the sense that said term is usually understood in this art, particularly with respect to the manufacture of "wash-board" glass. An ordinary corrugated roller, that is, one whose contour is in the shape of a sinusoidal curve and which is used to make glass plates for use in washboards, would not answer the purpose of an embedding roller to perform the functions of an embedding roller illustrated in Fig. 5 for the reason that the corrugations as a general rule are too close together and present too large an area for surface contact with the wire, in consequence of which the wire would not be embedded or buried beneath the surface, but would merely occupy a position where it would be exposed between the protuberances formed by such corrugated roller. The exposure of the wire to the atmosphere after the wire is heated by contact with the glass, is what I seek to avoid. The complete burying of the wire beneath the under surface of the top layer or sheet is what I seek to do, and this is done by the embedding blades of the roller 5.

By reference to Fig. 5 it will be seen that the glass does not entirely fill the spaces between the embedding blades and thus there are left on the underneath surface of the top layer or sheet, soft or unchilled protrusions, which have not been in contact with the metal of the embedding roller, and which insure a strong weld between the two layers.

Having thus described my invention, what I claim as new and desire to secure by Letters Patent is:

1. An apparatus of the character described, comprising means for forming a sheet of glass, means for burying wire beneath the under surface of said sheet, and means for forming another sheet or layer of glass and welding it to the uneven underneath surface of the sheet first referred to; substantially as described.

2. An apparatus of the character described, comprising means for forming a sheet of glass and simultaneously forcing a wire mesh through the underneath surface thereof so that it is completely covered, and means for forming a second sheet or layer of glass and welding it to the underneath surface of the sheet first referred to; substantially as described.

3. An apparatus of the character described, comprising means for forming a layer of glass and embedding a wire mesh through the underneath surface thereof so that it is completely covered, means for forming a second layer of glass, and means for combining said layers together; substantially as described.

4. An apparatus of the character described, comprising an embedding roller and coöperating means for forming a layer of glass and forcing a wire mesh through the underneath surface thereof so that it is completely covered, a pair of rolls for forming a second layer of glass, and means for welding said second layer to the underneath surface of the layer in which the wire mesh is embedded; substantially as described.

5. The method of making wire glass which consists in forming a mass of molten glass into a layer, forcing a wire mesh into the underneath surface of said layer so that it is completely covered, forming a separate mass of molten glass into a layer and combining said layers together; substantially as described.

6. The method of making wire glass which consists in rolling a mass of molten glass into a layer or sheet and simultaneously embedding a wire mesh in the underneath surface of said sheet so that it is completely covered, rolling an independent mass of molten glass into a second layer, and thereafter combining said layers together to form a single sheet; substantially as described.

In testimony whereof I hereunto affix my signature in the presence of two witnesses, this twenty sixth day of November 1907.

ROBERT A. B. WALSH.

Witnesses:
F. R. CORNWALL,
GEORGE BAKEWELL.